United States Patent [19]
Chasson

[11] 3,897,156
[45] July 29, 1975

[54] STRUCTURE FOR MEASURING THE AVERAGE DIAMETER OF AN APPROXIMATELY CIRCULAR CROSS-SECTION OF AN OBJECT

[75] Inventor: Leon H. Chasson, Santa Clara, Calif.

[73] Assignee: Atmospheric Sciences, Incorporated, Sunnyvale, Calif.

[22] Filed: Nov. 14, 1973

[21] Appl. No.: 415,565

Related U.S. Application Data

[62] Division of Ser. No. 166,418, July 27, 1971, Pat. No. 3,787,700.

[52] U.S. Cl. ............... 356/157; 250/560; 356/160; 144/312
[51] Int. Cl.² ................. G01B 11/10; G01B 11/28
[58] Field of Search .................. 250/223, 222, 560; 356/156, 157, 159, 160, 167, 199; 144/312

[56] References Cited
UNITED STATES PATENTS

| | | | |
|---|---|---|---|
| 3,035,478 | 5/1962 | Laycar | 356/160 |
| 3,066,226 | 11/1962 | Lindstrom | 250/222 R |
| 3,159,749 | 12/1964 | Dalrymple et al. | 250/223 X |
| 3,428,817 | 2/1969 | Hofmeister et al. | 250/222 X |
| 3,513,321 | 5/1970 | Sherman | 250/560 |
| 3,513,444 | 5/1970 | Henderson et al. | 356/157 X |
| 3,536,405 | 10/1970 | Flower | 250/560 |
| 3,549,896 | 12/1970 | Masino | 356/160 X |
| 3,659,950 | 5/1972 | Troll et al. | 356/199 |
| 3,724,958 | 4/1973 | Callan | 356/160 |

OTHER PUBLICATIONS

Weckler et al.: Design Possibilities for Photodiode Arrays with Integral Silicon-Gate Scan Generators; ISSCC; Feb. 18, 1971; pp. 130, 131, 202.

*Primary Examiner*—Walter Stolwein
*Attorney, Agent, or Firm*—Alan H. MacPherson

[57] ABSTRACT

A plurality of discrete marker sensors and a multiplicity of linear arrays are used to measure selected dimensions of passing objects. One linear array is used in conjunction with selected marker sensors to measure the lengths of objects and the remaining marker sensors and linear arrays are used to measure selected dimensions of objects perpendicular to their lengths. The system is particularly useful in measuring the lengths and selected diameters of logs.

11 Claims, 10 Drawing Figures

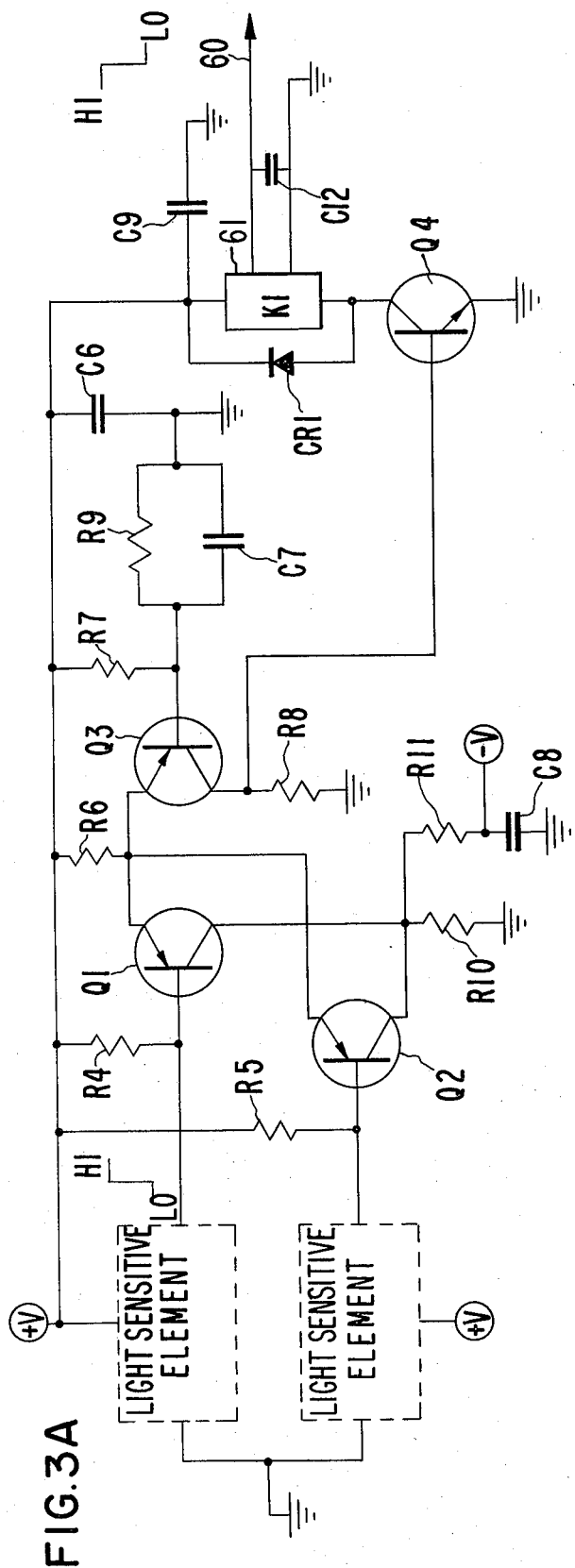
FIG.3A
FIG.3B
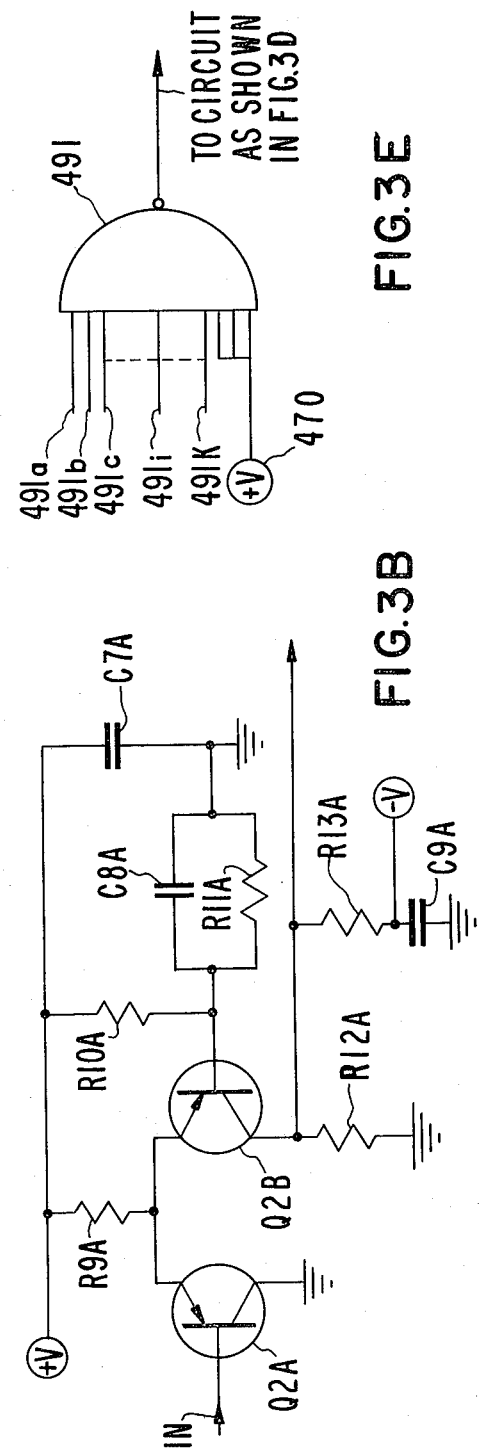
FIG.3E

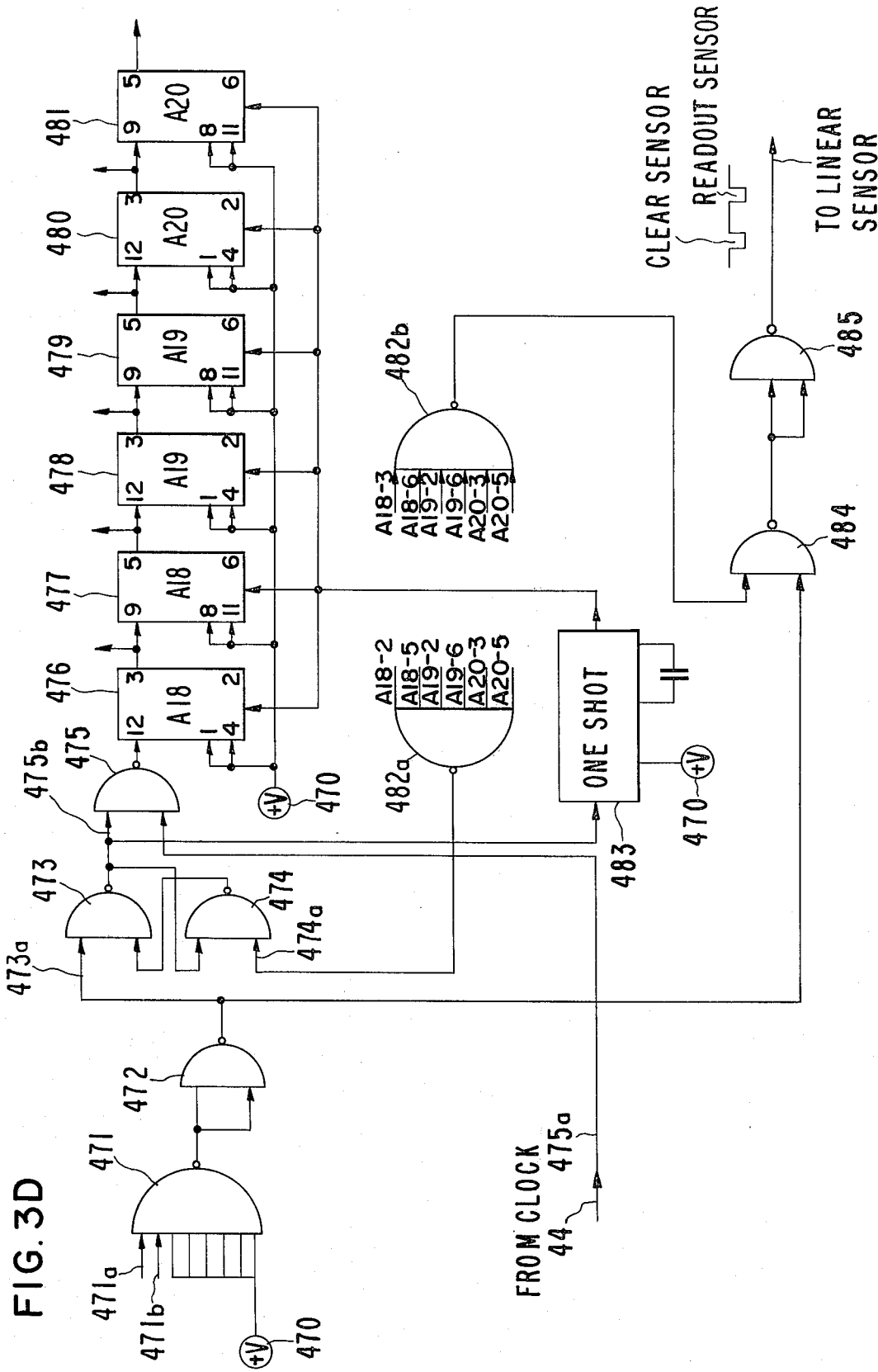

STRUCTURE FOR MEASURING THE AVERAGE DIAMETER OF AN APPROXIMATELY CIRCULAR CROSS-SECTION OF AN OBJECT

This application is a division of patent application Ser. No. 166,418 filed July 27, 1971, now U.S. Pat. No. 3,787,700 and claims the benefit of the filing date thereof.

BACKGROUND OF THE INVENTION

1. Field of the Invention

This invention relates to measuring systems, and in particular to a measuring system which automatically provides measurements of length, area and volume of a wide variety of objects.

2. Prior Art

The measurement of dimensions of objects is of importance in a wide variety of fields. In steel mills, the lengths of steel slabs must be measured. On highways, the lengths of trucks must be measured to ensure that they comply with the motor vehicle laws. Freight haulers must measure the volume of freight as well as its weight in order to properly calculate shipping charges.

Various techniques have been proposed to carry out such measurements automatically. In one system, mirrors rotate at a uniform rate and reflect light from the object whose length is being measured to a sensor. The number of light pulses generated by the sensor in response to light from a mirror being directed to the sensor together with the rotational rate determines the length of the object. Another length measuring system integrates over time a known rate of travel of an object to determine the length of the object. Both of these systems have disadvantages. Rotating parts in the first system require frequent maintenance and adjustment while the second system requires accurate knowledge of the velocity of the object whose length is being measured. Both of these systems are capable of measuring only one dimension, the length, of an object and not the other dimensions required to give the volume of the object.

SUMMARY OF THE INVENTION

This invention overcomes disadvantages of the prior art systems and provides a system which not only measures selected dimensions of a wide variety of objects, but which uses these measured dimensions to calculate areas and volumes and other parameters of the objects. The system of this invention uses no moving parts and is completely electronic. The output signals generated by the sensors used with this system are compatible with digital processing techniques without expensive analog-to-digital conversion and lend themselves particularly to use with a central processing unit capable of handling, on a multiplex basis, signals from a plurality of sensing systems.

According to this invention, a plurality of linear arrays of photosensitive elements are used to provide vernier measurements of the dimensions of an object and a selected number of discrete marker sensors are used to provide gross measurements of selected ones of these dimensions. A given dimension of an object is measured either by counting the number of discrete marker sensors activated by the object and adding to the length represented by these discrete marker sensors the object length detected by a linear array of photosensitive elements or by a linear array of photosensitive elements alone.

The light representing the object whose length is being measured impinges upon the photosensitive elements in the linear arrays. This light is selected to contrast sharply with the background illumination. The object whose length is being measured may be either significantly darker or significantly lighter than the background.

In the operation of the invented system, each linear array of photosensitive elements (hereafter called an "array" or a "linear array") is placed a selected and approximately known distance from the object whose length is being measured. Each array is scanned rapidly one or more times in response to signals from one or more discrete marker sensors. The scanning speed of each array is such that the objects moving past the array, is, relative to the scanning speed, essentially stationary over the scanning time. Thus errors introduced into the measurements by the movement of the object are negligible. The number of pulses produced by a linear array is directly proportional to the length of that portion of the object focused on the linear array.

The pulses from a linear array are sent through a buffer to a counter. The counter comprises, in one embodiment, a simple sequence of binary flip-flops. The output signal from the counter at the conclusion of the scan represents the number of pulses produced by the linear array and thus can be used in calculating a dimension of the object. These pulses, converted to a code word, are then gated to a computer for processing.

The processing computer is a specifically programmed general purpose digital computer, a special hard-wired computer, or an analog computer with appropriate input circuitry.

A variety of measurements can be obtained from the processing unit. Such measurements include lengths, volumes, cumulative volume of all similar objects which have passed by the discrete sensors and the arrays, useful volumes of material, and any other parameter calculatable from the linear dimensions measured. One particular application of the invented system is in the measurement of lengths and volumes of logs.

One advantage of the disclosed system is that by using two linear arrays to measure two diameters at the same cross section of a circular object, the average diameter measurement is independent of the location of the circular object relative to the linear arrays. Moreover, the displacement of the center of the object from a nominal position relative to the two linear arrays can be calculated from the images of the object on the two linear arrays. The disclosed system also compensates for the effect of the size of the object on the image detected by a linear array.

DESCRIPTION OF THE DRAWINGS

FIG. 3A shows circuitry suitable for use in shaping the pulses from the two diodes in each discrete marker sensor 1b through Kb in FIG. 1A;

FIG. 3B shows one possible driver circuit for use in blocks 43 and 45 shown in FIG. 2;

FIG. 3D shows the start pulse generating circuit 46 shown in FIG. 2;

FIG. 3E shows the NAND gate for receipt of the pulses from marker sensors 3b through Kb in FIG. 1A.

DETAILED DESCRIPTION

In explaining the operation of the measuring system of this invention, the way in which object lengths are measured using discrete marker sensors and a linear array will first be described. The processing of the signals produced by a typical linear array in the system will then be described. The above descriptions will be based on an embodiment of this invention used to measure the length, diameter and volume of logs. These descriptions are not to be interpreted as limiting the invention to the use described.

Figure 1C:
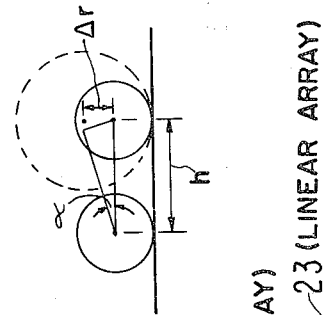
FIG. 1C illustrates the shift in the location of the center of a log from its nominal position due to movement of the log across the conveyor and also due to changes in the size of the log.
Figure 1B:
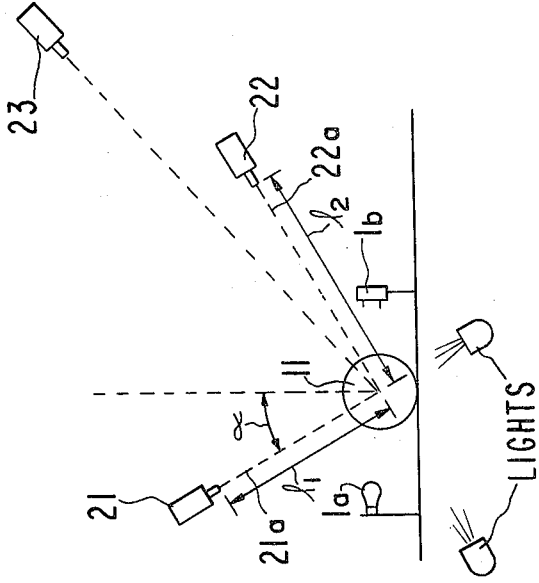
FIG. 1B shows an end view of the marker sensors and the diameter and length measuring linear arrays shown in FIG. 1A relative to a log.
Figure 1A:
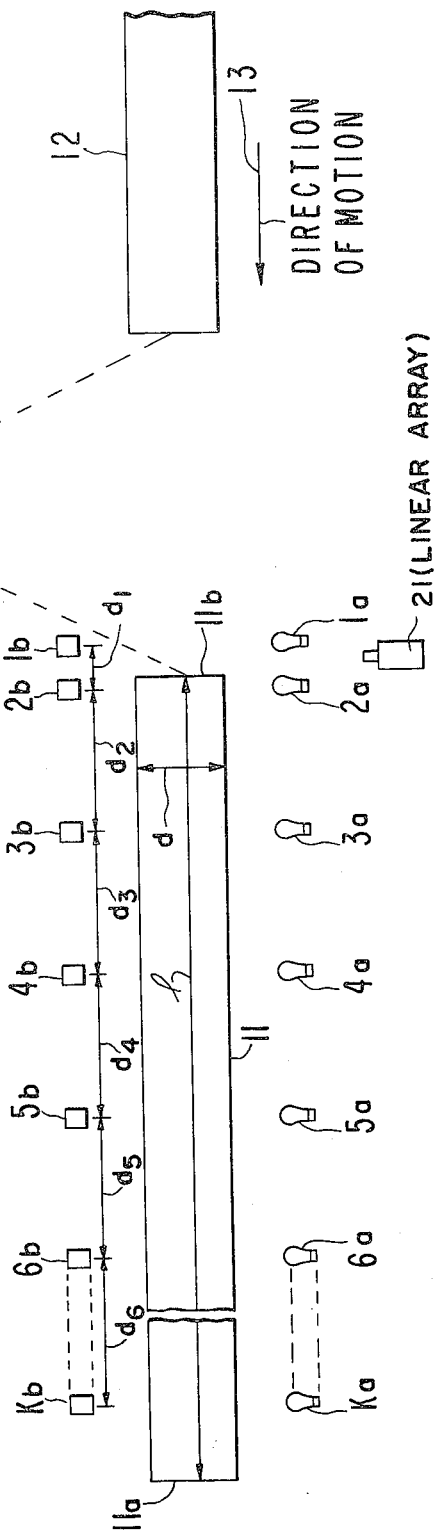
FIG. 1A shows a top view of one embodiment of this invention suitable for use in measuring the dimensions and volumes of logs and particularly shows the arrangement of the marker sensors and the diameter and length measuring linear arrays relative to a log the dimensions of which are being measured.

In FIG. 1A the direction of motion of objects 11 and 12, logs in one embodiment, is shown by arrow 13. Object 11 precedes object 12 by a selected distance and likewise moves in the direction of arrow 13. The length $l$ of object 11 is determined by the combination of signals from discrete marker sensors 1b through Kb, (where K is an integer representing the number of marker sensors) and from linear array 23. Linear array 23 comprises a linear sequence of photosensitive devices such as contained in the Fairchild Model FPA 600 bilinear self-scanned sensor array, for example. Each photosensitive device in the array, typically a diode or a phototransistor, stores a charge representative of the total light from a segment of space occupied by object 11 at a given time. The segment of space represented by the light impinging on one photosensitive element in array 23 corresponds to a linear distance along the longitudinal axis of object 11. The number of photosensitive devices in array 23 activated by light representing object 11 is thus proportional to the length of that part of object 11 within the field of view of array 23. Knowledge of the distance of linear array 23 from object 11 allows that portion of the total length of object 11 detected by array 23 to be calculated. This calculation is based on well-known principles of optics and trigonometry.

When object 11 is a log or pipe, for example, the measurement of representative diameters, and the length, of object 11 begins when the left end 11a of object 11 moves from the right of FIG. 1A past marker sensor 2b. Object 11 interrupts light transmitted from light source 2a which impinges on marker sensor 2b. The blocking of this light triggers the scanning of linear arrays 21 and 22 which measure two diameters of object 11. Preferably arrays 21 and 22 are arranged as shown in FIGS. 1A and 1B to measure mutually perpendicular diameters although the systme of this invention can also be used to measure non-perpendicular diameters. The center axes 21a and 22a of linear arrays 21 and 22, respectively, are aimed at a cross-section of object 11 a selected distance to the right of front end 11a of object 11. Each diameter-measuring linear array 21 and 22 is thus aligned to measure a dimension of object 11 perpendicular to its direction of travel. The way in which linear arrays 21 and 22 measure diameters will be described later.

As object 11 continues to move in the direction of arrow 13, it blocks the light travelling from light source 3a to marker sensor 3b. The distance $d_2$ between marker sensors 2b and 3b is known. Thus at the time object 11 blocks the light travelling from light source 3a to marker sensor 3b while still blocking the light travelling from light source 2a to marker sensor 2b, the system knows that object 11 is at least as long as distance $d_2$. It should be noted that the term "light" is used in this specification to denote not only visible radiation but also any radiation in other wavelengths, such as the infrared, capable of activating detectors suitable for use in marker sensors 1b through Kb.

Object 11 proceeds in the direction of arrow 13 blocking in sequence the light from light source 4a travelling to marker sensor 4b and the light from the remaining light sources travelling to their corresponding marker sensors. It should be understood that any number of marker sensors desired can be used with this invention depending on the lengths to be measured.

Each time the light from a source is blocked from travelling to its corresponding marker sensor by object 11, linear array 23 is scanned to determine if the end of the object appears in the field detected by this array. If it does not, the output pulses produced by linear array 23 are all substantially uniform due to the object occupying all the field of view of array 23. The appearance of the end 11b of object 11 is detected by noting a change in the level of the output pulses produced by this linear array at some point other than at the beginning or end of these pulse sequences.

The length measured by linear array 23 is greater than the maximum distance between adjacent marker sensors. This insures that linear array 23 will detect the end 11b of object 11 when this end is even with marker sensor 1b at the same time that end 11a of object 11 is even with one of the other marker sensors 3b through Kb. Alternatively, linear array 23 can be located so that it detects the end 11b of object 11 when this end is located to the right of marker 1b by no more than the maximum distance between adjacent marker sensors 2b through Kb simultaneously with end 11a of object 11 being opposite one of discrete marker sensors 3b through Kb.

When end 11a of object 11 blocks the light beam between a light source and its corresponding discrete marker sensor simultaneously with the appearance of the end 11b of object 11 in the field of view of linear array 23, the total length of object 11 is equal to the sum of the distances between the marker sensors activated by object 11 plus that portion of the length of object 11 measured by linear array 23. Finally when the right end 11b of object 11 passes marker sensor 1b, light strikes this sensor, triggering the scanning of linear arrays 21 and 22 to measure two diameters (usually mutually perpendicular) near the right end 11b of object 11.

Figure 2:
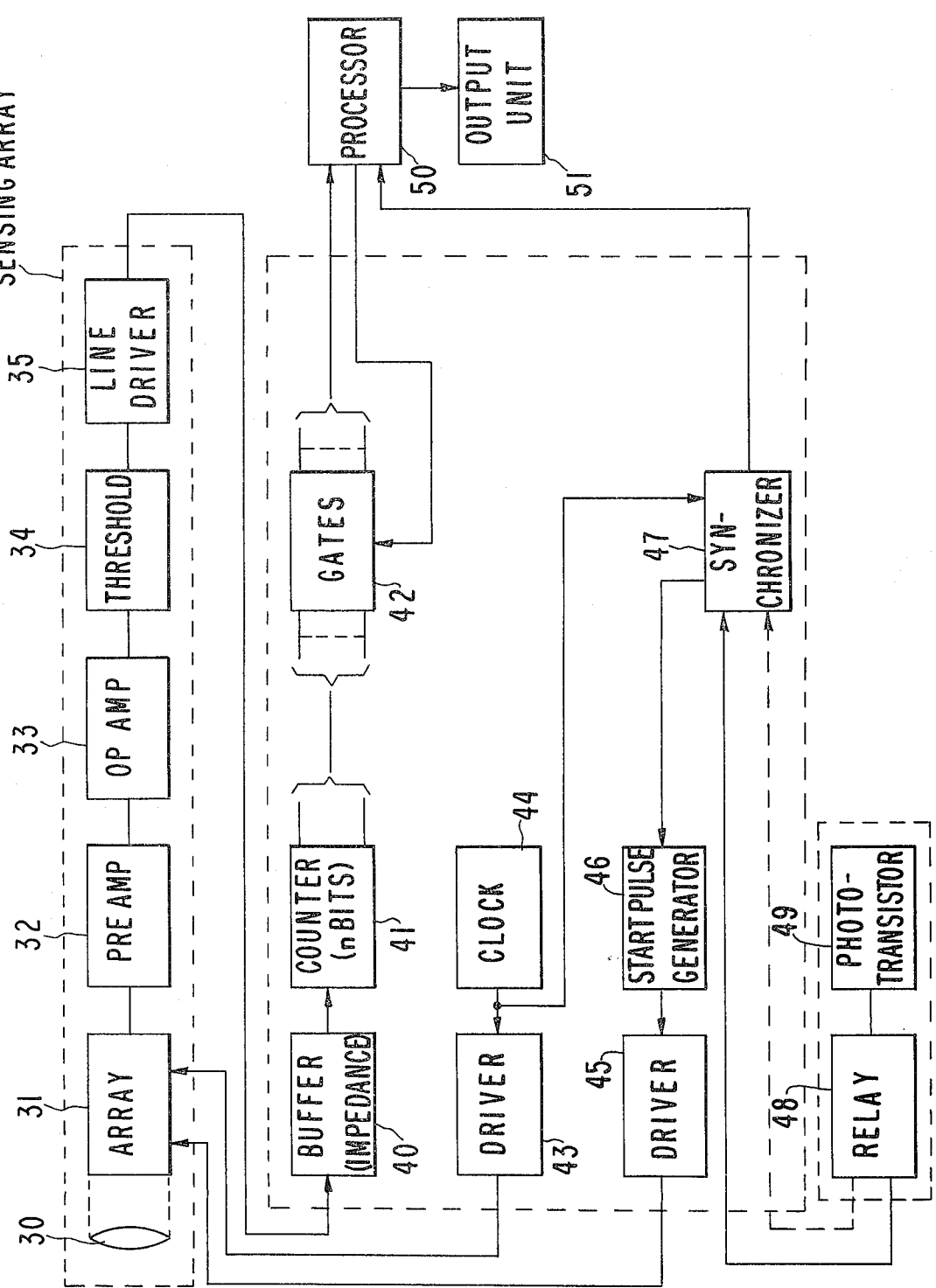
FIG. 2 shows a block diagram of the system of this invention for processing data from one of the linear arrays 21, 22 or 23 shown in FIGS. 1A and 1B.

Each marker sensor contains two photodevices. The appropriate linear array or arrays are activated by a signal from either photodevice. Each time a marker sensor kb is activated, where k is an integer with a value given by $1 \leq k \leq K$, at least one photodevice (shown in FIG. 2 as a phototransistor) contained in the activated marker sensor, such as phototransistor 49 (FIG. 2), in turn activates relay 48. Relay 48 is, in another embodiment, replaced by an electronic drive circuit. The output signal from relay 48 is synchronized in synchronizer 47 with the signal from clock 44. The output pulse from synchronizer 47 activates start pulse generator 46 which produces two signals which are transmitted through driver 45 to start the scanning of the linear array 31 (FIG. 2). The first signal causes the linear array to be scanned a first time. This first scan clears the array. The second signal then causes the array to be scanned before the photosensitive elements in the array saturate and provides signals representing the length of that portion of object 11 in the field of the array. It should be noted that the light representing object 11 is focused on array 31 by lens 30. If array 31 corresponds, for example, to the array in the sensing unit 23 (FIGS. 1A and 1B), then light energy representing some portion of object 11 is focused by lens 30 onto the photosensitive elements in linear array 31. This light energy is read out in sequence by scanning circuitry typically (although not necessarily) contained on the semiconductor chip on which the linear array is formed. The pulses representing the incident energy detected by adjacent photosensitive elements on the linear array are passed through preamplifier 32, operational amplifier 33, and threshold detector 34 to line driver 35. Threshold detector 34 shapes all pulses above a minimum amplitude. The pulses from line driver 35, the last circuit contained in sensor array 23, are then transmitted over a cable, typically a twisted pair, to buffer 40, an impedance transformer. From buffer 40, these pulses are sent to an n-bit counter 41, which in one embodiment comprises a sequence of binary flip-flops connected in well-known fashion to provide in binary a number equivalent to the total number of pulses transmitted from linear array 31. Typically, counter 41 is a six-bit counter although other capacity counters can also be used. The output pulses from counter 41 are gated in parallel by gates 42 to processor 50. Processor 50, which in one embodiment is a digital computer, analyzes this binary code word to determine if the end 11b of object 11 has been found. If it has, it processes the code word together with a signal from synchronizer 47 which indicates which discrete marker sensor was just activated by the left end 11a of log 11. From this information, processor 50 calculates the total length of object 11 from the equation $$l = \sum_{i=1}^{k} d_i + l_A + C_1 \quad (1)$$

In equation 1, $d_i$ equals the distance between the $i^{th}$ and the $(i^{th}-1)$ discrete marker sensors, $i$ is a summation index, $k$ represents the marker sensor just passed by left end 11a of object 11 when right end 11b of object 11 is in the field of view of array 23, $l_A$ is that portion of the length of object 11 detected by linear array 23, and $C_1$ is a correction constant to compensate for a variety of factors including any overlap in the length $l_A$ measured by linear array 23 with a length already measured by the marker sensors. $C_1$ can also include corrections in length $l_A$ for the effects of changes in the diameter and in the location of object 11 as it passes the marker sensors. Other corrections such as those required by light fringing effects, aberrations in lens 30 (FIG. 2), and the appearance of the face of end 11b in the view field of array 23 can also be included in $C_1$. These effects are, however, mostly second order and have negligible effects on system accuracy.

FIG. 3A shows typical circuitry associated with each marker sensor. It should be noted that each marker sensor 1b through Kb (FIGS. 1A, 1B) comprises two photosensitive devices, preferably phototransistors. This safety feature ensures that even if the light to one photosensitive device in a marker sensor is not blocked by object 11, as might happen when object 11 is curved, the other photodevice in the marker sensor changes from a high current output state to a low current output state. Consequently, the voltages on the bases of the transistors Q1, Q2, (FIG. 3A) or both, rise to approximately the supply voltage +V, and either or both of these two transistors turn off. The drop in current drawn by these two transistors through resistor R6 raised the emitter voltage on transistor Q3 above its base voltage. Consequently, transistor Q3 turns on. The collector voltage of Q3 rises thereby turning on transistor Q4. Transistor Q4's collector current closes relay 61. Thus the output signal on lead 60 drops from high to low level. This low level signal is then transmitted to synchronizing, pulse generating, and computer interface logic.

It should be noted that if desired, relay 61 can be replaced by a line driver circuit similar to that shown in FIG. 3B. In the circuit of FIG. 3B, the breaking of light to a marker sensor by object 11 turns on transistor Q2A and turns off transistor Q2B. As a result the output signal on the collector of transistor Q2B drops from high level to low level. This output signal is used in the same manner as is the signal on lead 60 (FIG. 3A).

The low level signal on lead 60 is sent to input lead 462a of exclusive OR gate 462 (GIG. 3C) which is part of synchronizer 47 (FIG. 2). Input lead 462a is tied to the positive voltage source 470 through resistor 461. The other input lead 462b to this exclusive OR gate can be tied to either positive voltage source 470 or ground. If this lead is attached to voltage source 470 by having switch 463 contact node 463a, then the inverted output signal from exclusive OR gate 462 is high level when the signal level on lead 60 (FIG. 3A) is high level and is low level when the signal level on lead 60 (FIG. 3A) is low level. On the other hand, if input lead 462b to gate 462 is connected to ground by having switch 463 contact node 463c, then so long as the output signal on lead 60 from relay 61 is high level, exclusive OR gate 462 produces a low level output signal. when the output signal on lead 60 goes low level, the output signal from exclusive OR gate 462 goes high level. Switch 463 is connected to either node 463a or node 463c depending upon which discrete marker sensor 1b through Kb drives relay 61 (FIG. 3A). Marker sensor 1b is designed to activate start pulse generator 46 when light from light source 1a impinges upon marker sensor 1b. Thus the output signal from the exclusive OR gate 462 driven by marker sensor 1*b* must go high level in response to light falling upon marker sensor 1*b*. Accordingly, input lead 462*b* must be connected to node 463*a* by switch 463.

On the other hand, when start pulse generator 46 is driven by signals from marker sensors 2*b* through K*b*, a pulse must be generated in response to the blocking of the light from any one of light sources 2*a* through K*a* to the corresponding marker sensor. Accordingly, the output signal from exclusive OR gate 462 must go high level in response to the output signal on lead 60 (FIG. 3A) going low level. Switch 463 thus must contact node 463*c*.

Figure 3C:
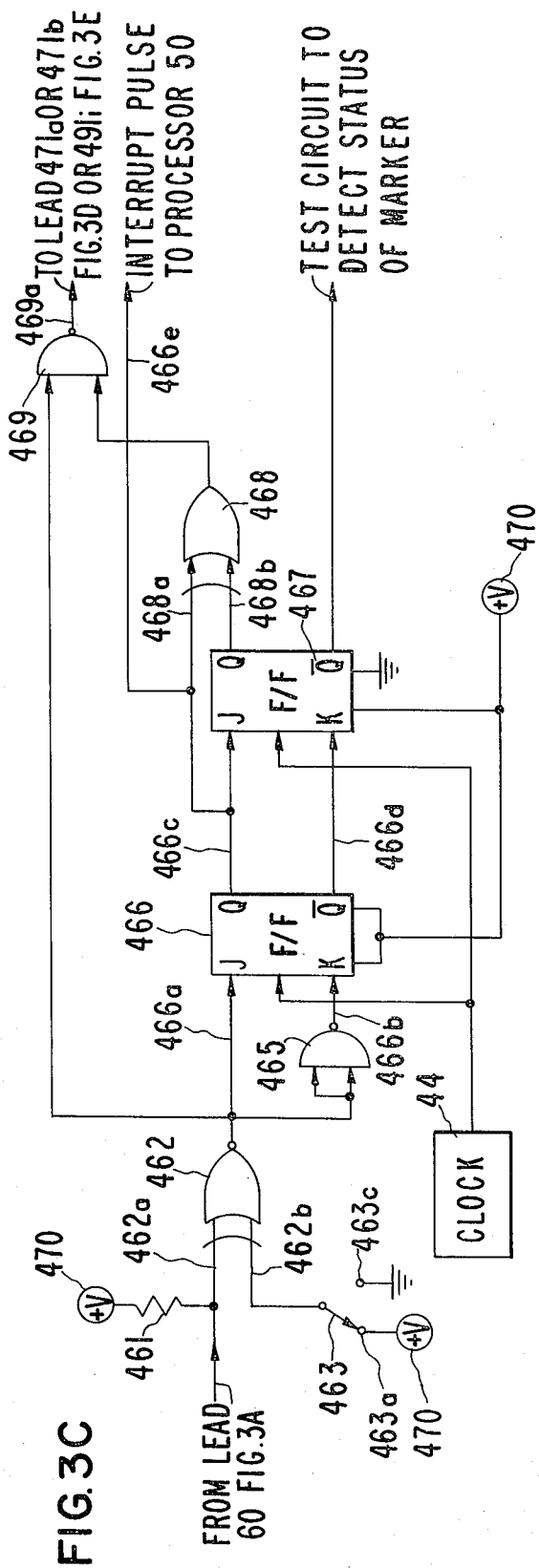
FIG. 3C shows a synchronizing circuit suitable for synchronizing a pulse from a marker sensor with the output pulses from clock 44 (FIG. 2)

The high level output signal from gate 462 is sent three places. First, it is sent directly to JK flip-flop 466. Second, it is sent through NAND gate 465 connected as a buffer-inverter to another input lead to JK flip-flop 466. Third, the high level output signal from exclusive Or gate 462 is sent to one input lead to NAND gate 469. The other input lead to AND gate 469 is connected to the output lead of exclusive OR gate 468. Upon the changing of the signal level from exclusive OR gate 462 from low to high, JK flip-flop 466 is made ready to be toggled from one state to its other state. Pulses from clock 44 are transmitted to flip-flop 466 and also to JK flip-flop 467. The change in state of the output signal from exclusive OR gate 462 is not in general synchronized with the output pulses from clock 44. Flip-flop 466 thus is triggered by the next pulse from clock 44 following the change in the level of exclusive OR gate 462's output signal from low to high. Essentially, flip-flop 466 synchronizes the change in output signal level from a marker sensor with the pulses from clock 44 (FIGS. 2 and 3C).

When flip-flop 466 toggles in response to the next clock pulse, the signal level on output lead 466*c* from flip-flop 466 goes high level. This high level signal is sent two places. First it is sent to processor 50 after a delay of about 20 milliseconds to allow fresh data to enter counter 41 (FIG. 2). This signal interrupts and informs processor 50 that a marker pulse has been generated. Processor 50 then interrogates counter 41 by activating gates 42 (FIG. 2) and determines whether end 11*b* of object 11 is in the field of view of linear array 23 by comparing the number stored in counter 41 to the maximum number which can be stored in this counter. If the stored number is smaller than the maximum number, the end 11*b* of object 11 is in the field of view of array 23 and the length of object 11 can be calculated.

In addition, the output pulse from flip-flop 466 (FIG. 3C) is sent on input lead 468a to exclusive OR gate 468. The high level input signal on lead 468*a* is transmitted through exclusive OR gate 468 and becomes a high level output signal which is transmitted to the other input lead of NAND gate 469. Consequently, NAND gate 469 produces a low level output pulse. This low level output pulse is transmitted to a selected lead on NAND gate 471 (FIG. 3D) when the marker pulse is generated by either marker sensor 1*b* or 2*b* or to one input lead of NAND gate 491 (FIG. 3E) when the marker pulse is generated by a marker sensor 3*b* through K*b*. The low level output pulse from NAND gate 469 has a period equal to the period of the clock pulses from clock 44. This occurs because on the next clock pulse from clock 44, flip-flop 466 is not toggled but flip-flop 467 is toggled thereby changing the output signal on lead 468*b* from low to high level. The simultaneous high level signals on two input leads to exclusive OR gate 468 drop its output signal to a low level thereby disabling NAND gate 469. Consequently, the output signal on lead 469*a* from NAND gate 469 rises from a low to a high level. This occurs even though the output signal level from exclusive OR gate 462 remains high level.

It should be noted that the Q output lead from flip-flop 467 can be used as a test lead to detect the status of the marker sensor which drives it. When the output signal level on this lead is high, the marker sensor has not been activated. When the output signal level on this lead is low, the marker sensor has been activated.

When the marker sensor supplying the pulse to the circuit shown in FIG. 3A is either marker 1*b* or 2*b*, then the lead 469*a* is attached to one of the two input leads 471*a* and 471*b* to NAND gate 471 (FIG. 3D). Input lead 471*a* is, for example, connected to the output lead from the synchronizing circuit 47 (FIG. 2) which is driven by a signal from marker sensor 1*b* while input lead 471*b* is connected to the output lead from the synchronizing circuit 47 connected to marker sensor 2*b*. Normally the signal levels on these two input leads are high. The presence of a signal from either marker sensor 1*b* or 2*b* results in the signal level on one of these two input leads to NAND gate 471 dropping to a low level for the duration of the pulse from NAND gate 469 (FIG. 3C). The other input leads to NAND gate 471 are connected to positive voltage source 470 and thus have high level signals on them. The output signal from NAND gate 471 is normally low level. The presence of a low level pulse on one of the two input leads 471*a* or 471*b* to NAND gate 471 results in this output signal level going high for the duration of the pulse. The output signal from NAND gate 471 is applied to NAND gate 472 connected as an inverter and producing a low level pulse on its output lead. This low level pulse is sent to one input lead of NAND gate 484. This low level pulse is also sent to input lead 473*a* to NAND gate 473. NAND gate 473 is connected with NAND gate 474 to form a bistable flip-flop. The low level pulse on one input lead to NAND gate 473 produces a high level output signal from this NAND gate. This high level output signal is then transmitted to one input lead of NAND gate 474. Lead 474a to NAND gate 474 has a normally high level signal on it. Therefore the output lead from NAND gate 474 drops to a low level and is fed back to the other input lead of NAND gate 473. The high level output signal and NAND gate 473 is transmitted to one shot 483. One shot 483, however, is activated by a negative-going rather than a positive-going pulse. Therefore the change in the signal level on the output lead from NAND gate 473 from low level to high level has no effect on one shot 483.

The high level pulse on the output lead from NAND gate 473 is transmitted on input lead 475*b* to NAND gate 475. The other input lead to NAND gate 475 receives pulses from clock 44. Thus the high level output signal from NAND gate 473 enables NAND gate 475 allowing pulses from clock 44 to be transmitted to a counter comprising a plurality of flip-flops. As shown in FIG. 3D, the counter comprises six flip-flops. Other numbers of flip-flops can be used in this counter depending upon the maximum binary number to be stored in the counter. The binary counter shown in FIG. 3D comprises flip-flops 476 through 481. These flip-flops are arranged in pairs A18, A19 and A20. The leads from the flip-flops are denoted by numbers. Selected output leads from each flip-flop are connected to NAND gates 482a and 482b as shown by the numbers on each of the input leads to these NAND gates. For example, NAND gate 482a has six input leads connected to output leads 2 and 5 from flip-flop A18 (denoted A18-2 and A18-5), output leads number 2 and 6 from flip-flop A19, and output leads 3 and 5 from flip-flop A20. When the signal levels on these six output leads are all high level, the output signal from NAND gate 482a drops to a low level. This low level signal then drives the output signal from NAND gate 474 to a high level thereby driving the output signal from NAND gate 473 to a low level and disabling NAND gate 475. No further clock pulses are then transmitted through NAND gate 475.

The duration of the low level output pulse from buffer-inverter 472 is only one period of the pulses from clock 44. However, the output signal level from NAND gate 473 remains high until the output signal from NAND gate 474 goes high. This occurs when the output signal from NAND gate 482a drops low in response to high level signals on all the input leads to NAND gate 482a.

The pulses from clock 44 change the state of the counter comprising the six flip-flops 476 through 481. Each clock pulse drives the counter to increase the count stored in the counter by one. When the count stored in the counter corresponds to a given number, then the output signal from NAND gate 482b drops from its normally high level to a low level.

Because NAND gates 482b and 472 produce normally high output signals, NAND gate 484 produces a normally low level output signal and NAND gate 485 produces a normally high-level output signal. Accordingly, the receipt of the low level pulse from NAND gate 472 produces a first low level output pulse from NAND gate 485. This first low level output pulse is transmitted to the appropriate linear array or arrays to be activated by the marker sensor from which the signal was originally derived. In the system shown in FIG. 1B, both linear arrays 21 and 22 are activated by a signal from either marker sensor 1b or marker sensor 2b. Linear array 23 is activated by a pulse from any one of marker sensors 3b through Kb.

The first pulse from NAND gate 485 first clears the appropriate linear array or arrays by scanning them. At the time of a pulse from a marker sensor, each linear array has been exposed for a long period of time to light and is saturated. The normal integration time to which each phototransistor or photodiode in the linear array should be exposed to light in order to obtain a linear signal proportional to the incident light is much shorter than the time between the activation of adjacent marker sensors. Thus all the light sensitive elements in the linear array or arrays to be scanned are usually saturated. The first pulse thus merely clears the saturated signals stored in thse linear arrays.

A second scanning pulse is generated when all of the input signals on the input leads to NAND 482b go to a high level. At this point NAND gate 482b produces a low level output signal. This low level output signal is transmitted through NAND gate 484 and 485 and appears on the output lead from NAND gate 485 as a low level output pulse. This second output pulse, which occurs a given number of clock pulses after the low level output pulse first appears on the output lead from NAND gate 472, then initiates a scan of the appropriate linear array or arrays. This scan reads out the signals stored by the photosensitive elements in these two linear arrays. These signals are the signals generated by these linear arrays in the period of time between the two scans. This period of time is selected so that the linear arrays do not saturate. A selected number of clock pulses after the second readout pulse appears on the output lead of NAND gate 485, NAND gate 482a produces a low level output pulse thereby disabling NAND gate 475. The change in signal level on the output lead from NAND gate 473 from high level to low level then triggers one shot 483 to clear the signals stored in flip-flops 476 through 481 and resets these flip-flops to zero in preparation for the next signal.

FIG. 3E shows NAND gate 491 used to receive the signals from marker sensors 3b through Kb. These signals are used in the system shown in FIGS. 1A and 1B, to activate linear array 23. There are as many input leads to NAND gate 491 as there are marker sensors 3b to kb. Normally, the signal level on each input lead is high. When, however, a marker sensor is activated, the signal level on the corresponding input lead drops to a low level thereby creating a high level pulse on the output lead from NAND gate 491. This high level output pulse is then transmitted to the NAND gate corresponding to NAND gate 472 (FIG. 3D) and there activates a circuit identical to that shown in FIG. 3D. Two output pulses are likewise generated. The first output pulse clears linear array 23 to remove the saturated signals stored there as a result of past integration of incident light flux. The second pulse then reads out the linear signals newly stored subsequent to the first pulse.

The linear array used with this invention can be identical or similar to the linear array described by G. P. Weckler and R. H. Dyck in a paper entitled, "A Versatile Silicon Gate Shift Counter for Scanning Arrays of Photo Diodes" presented at the 1971 ISSCC in February. In addition, a linear, self-scanning silicon gate MOS photodiode array was described by G. P. Weckler at the June, 1970, Solid State Sensors Symposium in Minneapolis, Minnesota.

In this invention, the signals detected by linear array 31 (FIG. 2) are amplified and passed through a threshold detector 34 where they are reshaped into high level or low level pulses depending upon the amplitude of the output signal from the threshhold detector. It should be noted that when the linear array is used to measure the dimensions of an object, light representing the object is carefully controlled to have a substantially different amplitude than does the light from the background. Thus, the object is differentiated from the background by substantial differences in the levels of signals produced by the linear array. Accordingly, the object is represented by either high or low level pulses from linear array 31 while conversely the background is represented by either low or high level pulses.

Figure 3F:
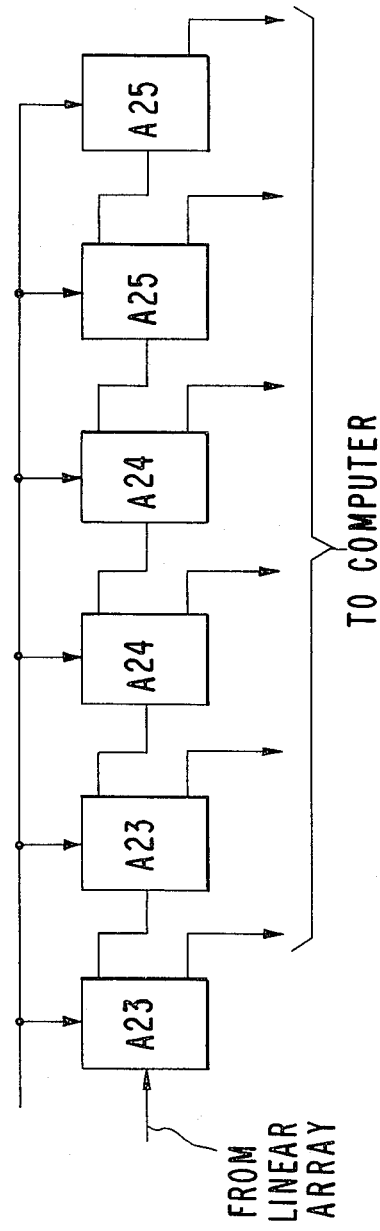
FIG. 3F shows a register comprising a plurality of flip-flops for storing a binary code word representing the number of output pulses from a linear array such as arrays 21, 22 and 23 shown in FIG. 1A.

The binary counter 41 shown in FIGS. 2 and 3F counts the number of pulses read out from linear array 31. The count representing these pulses is stored in counter 41 and upon a command is read out in parallel from counter 41 and sent to a processor 50 (FIG. 2). In this processor the count is then used to calculate either the diameter of object 11, or, if these pulses are read out from linear array 23, the length of object 11.

It should be noted that FIGS. 3A and 3C show the circuitry associated with only one of marker sensors 1b through Kb. One such combination of circuitry exists for each marker sensor. The circuitry activated by marker sensors 1b or 2b in turn activates simultaneously linear arrays 21 and 22 to measure two perpendicular diameters of object 11. The circuitry activated by any one of marker sensors 3b through Kb activates linear array 23 to measure the length of a portion of object 11. It should be noted that each time a pulse is generated from any one of marker sensors 3b through Kb, an interrupt signal is sent to processor 50. Processor 50 then samples the output signal from each marker sensor to determine which marker sensor has changed state (see lead 466e, FIG. 3C). Upon the detection in processor 50 of a number stored in counter 41 (FIG. 2) less than the maximum number of pulses capable of being stored in linear array 23, processor 50 begins calculations to determine the length of object 11. The volume of object 11 can be determined only when end 11b of object 11 has passed marker sensor 1b and had its diameter measured. Processor 50 calculates the length from the number of pulses produced by the linear array 23 together with the number of marker sensors 3b through Kb which have been activated by the object 11. The two diameters of the left end of object 11 were previously measured when end 11a activated marker sensor 2b. These two diameter measurements have been stored in processor 50 by being transmitted from two counters identical to counter 41 (FIG. 2). When the right end 11b of object 11 passes marker sensor 1b and allows light to strike this sensor, linear arrays 21 and 22 will again be activated to measure the diameter of the right end of this object. These diameter measurements will then be transferred to processor 50 and used in calculating the volume of object 11. The equations to calculate the volume of object 11 are well known and correspond to those required to calculate the volume of a frustum of a cone. The diameter of each end of the frustum is determined by averaging the two mutually perpendicular diameters measured by the linear arrays 21 and 22.

In the configuration under discussion, the log has been illuminated from the same side as the linear array. It has been determined that this approach can cause a small error due to large variations in log reflectivity. By placing directed light behind the log 180° from each linear array 21 and 22, the log can be made to appear as a dark object with the background lighted. This alternate configuration results in a constant amplitude of light energy impinging on the linear array which provides the highest possible accuracy in those situations where it is necessary.

When the above described system is used to measure the diameters, lengths and volumes of logs, several unexpected and unobvious advantages accrue. First, the logs are often transferred in mills on conveyor belts or rollers. Often the log is not located in the center of the conveyor but rather to one or the other side of the conveyor. When that occurs, a system which uses only one linear array to measure the diameter of the log will measure a smaller than real diameter if the log is on the far side of the conveyor belt or a larger than real diameter if the log is on the near side of the conveyor belt. The system of this invention on the other hand overcomes this disadvantage. By properly locating diameter sensors 21 and 22, the true diameter of the log can be measured regardless of where the log is located on the conveyor belt. Thus the output volume calculated by the computer is independent of the location of the log on the conveyor belt. Another advantage accrues when logs are curved. The system of this invention can be used to measure the curvature of the logs. This is done by activating diameter sensors comprising linear arrays 21 and 22 each time a marker sensor 3b through Kb is activated by the log. The relative diameters measured by linear arrays 21 and 22 each time a marker sensor 3b through Kb is activated are a measure of the curvature of the log.

The ability of the described system to compensate for a shift in the position of object 11 across the conveyor belt from the nominal position of an object on the conveyor belt can be seen from the following considerations. The shift of the object from the center line of the conveyor can be calculated for a given sized object using only the image lengths measured by two linear arrays. The shifts of the locations of the images of the object along the linear arrays do not have to be taken into consideration when two linear arrays are used and considerable simplicity in the calculations is made possible by the use of two such arrays. The relationship between an object size and an image size is given by the following equation:

$$y = (f/l) d \qquad (2)$$

In Equation 2, $y$ is the size of the image detected by the linear array, $f$ is the distance from the principle plane of the lens 30 (FIG. 2) to the photosensitive elements comprising the linear array, $l$ is the distance from a reference point on object 11 to the principle plane of the lens 30, and $d$ is the dimension being measured on object 11. Referring now to FIGS. 1B and 1C, a shift of the center of object 11 to the left by the distance $h$ results in the distance $l_1$ of the center of object 11 from the lens 30 of linear array 21 being given by the following equation:

$$l_1 = \overline{l_1} - h \sin \alpha \qquad (3a)$$

In Equation 3a, $\overline{l_1}$ is the nominal distance of the center of object 11 from the principle plane of lens 30 when object 11 is in its nominal position as it passes the measuring system, and $\alpha$ is the angle between the centerline 21a of linear array 21 and the vertical. Simultaneously, the distance $l_2$ between the center of object 11 and the principle plane of lens 30 in array 22 (FIG. 2) is given by:

$$l_2 = \overline{l_2} + h \cos \alpha \qquad (3b)$$

In Equation 3b $l_2$ is the nominal distance from the center of object 11 to the principle plane of lens 30.

Substituting Equations 3a and 3b into Equation 2 and adding subscripts 1 and 2 to denote linear arrays 21 and 22 respectively, and then subtracting the nominal image size $\overline{y}$ detected by each array from the image size $y$ actually detected by each array gives for the incremental change $\Delta y$ in image size due to the shift in location of object 11 by the distance h in arrays 21 and 22 respectively, the following:

$$\Delta y_1 = [fh/l_1^2]d_1 \sin \alpha \quad (4a)$$

$$\Delta y_2 = [-fh/l_2^2]d_2 \cos \alpha \quad (4b)$$

In Equations 4a and 4b, $d_1$ and $d_2$ represent the diameters of object 11 to be measured by arrays 21 and 22 respectively. The image sizes detected by arrays 21 and 22 are given as follows:

$$y_1 = \overline{y}_1 + \Delta y_1 \quad (5a)$$

$$y_2 = \overline{y}_2 + \Delta y_2 \quad (5b)$$

In Equations 5a and 5b, $\overline{y}_1$ and $\overline{y}_2$ represent the normal image sizes detected by arrays 21 and 22 for an object 11 properly centered on the conveyor while $\Delta y_1$ and $\Delta y_2$ represent the shifts in these image sizes due to the shift in location of object 11. The difference $\Delta y = \overline{y}_1 - \overline{y}_2$ becomes, upon assuming that $y_1$ equals $y_2$ (which means the $d_1$ equals $d_2$, a reasonable assumption when object 11 is approximately round):

$$\Delta y = \Delta y_1 - \Delta y_2 \quad (6)$$

For simplicity, the nominal distances between the lens 30 in each array 21 and 22 and the center of object 11 in its normal location are now assumed equal. Substituting Equations 4a and 4b into Equation 6 and solving for $h$, the shift in location of object 11, gives the interesting result that the shift $h$ is a function of the difference $\Delta y$ in image sizes measured by arrays 21 and 22 as well as certain other system parameters.

$$h = \Delta y/[f(d/l^2)(\sin \alpha + \cos \alpha)] \quad (7)$$

In Equation 7, $d$ is the average diameter of the object whose displacement is being measured, while the parameters $f$, $l$, and $\alpha$ are all dimensions of the system. $\Delta y$ is calculated by subtracting the image length $y_2$ measured by array 22 from the image length $y_1$ measured by array 21.

The average diameter $d$ of object 11 is given by the following equation:

$$d = [(\overline{y}_1 + \overline{y}_2)/2]l/f \quad (8)$$

Substituting from Equations 5a and 5b for $y_1$ and $y_2$ into Equation 8 and solving for d gives the following result:

$$d = [y_1 + y_2]/[2(1 + (h/2l)(\sin \alpha - \cos \alpha)]f/l \quad (9)$$

Equation 9 shows that if $\sin \alpha$ equals $\cos \alpha$, $d$ is proportional to just the sum of the image size $y_1$ detected by array 21 plus the image size $y_2$ detected by array 22 divided by 2. If, on the other hand, the angle $\alpha$ between the vertical and the center line of array 21 is other than 45° (and assuming of course that arrays 21 and 22 are mutually perpendicular), then an additional correction must be made for this angle. This additional correction is proportional to the term $(fh/l^2)$. Equation 9 thus gives the important result that when $\cos \alpha = \sin \alpha$, the average diameter $d$ measured by the array is independent of small shifts $h$ in location of object 11. By locating the arrays reasonably far from object 11, even good sized movements of object 11 can be shown to have little or no effect on the measured diameter $d$.

By substituting for $d$ from Equation 9 into Equation 7, a new equation giving the shift $h$ as a function of the measured images $y_1$ and $y_2$ together with the system parameters $l$ and $\alpha$ is obtained.

$$h = l[(y_1 - y_2)/(y_1 \cos \alpha + y_2 \sin \alpha)] \quad (10)$$

Equation 10 shows one relationship which can be used to calculate the shift in position $h$ as a function of the image sizes $y_1$ and $y_2$. The shift $h$ in position of object 11 can then be used to correct the length measurement made by linear array 23. This correction is given by the following equation where $\beta$ is the angle between the center line of array 23 and the vertical line shown in FIG. 1B.

$$y_2 = [f/(l + h \sin B)]x \quad (11)$$

In Equation 11, $y_3$ is the image distance measured by array 23, $f$ is as defined above, $l$ is the distance from the lens 30 of array 23 to the nominal position of object 11, $h$ is the horizontal shift of object 11 across the conveyor belt and $x$ is the portion of length of object 11 measured by array 23. Equation 11 shows that if array 23 is directly vertically over object 11 (i.e., $\beta = 0$), small shifts $h$ in location of object 11 relative to array 23 have no effect on the length measured by array 23.

An additional correction is made to compensate for the effects of different size objects on the dimensions measured by arrays 21, 22 and 23. Referring to FIGS. 1B and 1C, it is seen that the distance $l_1$ between the center of object 11 and the principle plane of lens 30 of linear array 21 is given by the following equation:

$$l_1 = \overline{l}_1 - \Delta r \cos \alpha \quad (12a)$$

In Equation 12a, $\overline{l}_1$ is the nominal distance from the principle plane of lens 30 in linear array 21 to the center of the nominal-sized object whose dimensions are being measured, and $\Delta r$ is the shift in vertical location of the center of the actual object 11 being measured from the center of the nominal object 11. The angle $\alpha$ is as defined above. Likewise, the distance $l_2$ between the center of object 11 and the principle plane of lens 30 in linear array 22 is given by:

$$l_2 = \overline{l}_2 - \Delta r \sin \alpha \quad (12b)$$

The terms in Equation 12b are as defined above with respect to Equation 12a with respect to linear array 22. Substituting Equations 12a and 12b into Equation 2 and adding the subscripts 1 and 2 to denote linear arrays 21 and 22, the following equations are obtained for the image sizes $y_1$ and $y_2$ as a function of change in radius $\Delta r$ of object 11 from a nominal radius.

$$y_1 = [fd_1/\overline{l}_1][1 + (\Delta r/\overline{l}_1) \cos \alpha] \quad (13a)$$

$$y_2 = [fd_2/\overline{l}_2][1 + (\Delta r/\overline{l}_2) \sin \alpha] \quad (13b)$$

In Equations 13a and 13b the term $fd/\overline{l}$ with the appropriate subscript 1 or 2 represents the image size which would have been measured by the appropriate linear array if the center of object 11 were in the same location as the center of a nominal sized object 11. The image size is related to the image size $\overline{y}$ of the nominal sized object as follows:

$$y_1 = [\overline{y}_1 + (f/\overline{l}_1) 2\Delta r][1 + (\Delta r/\overline{l}_1) \cos \alpha] \quad (14a)$$

$$y_2 = [\overline{y}_2 + (f/\overline{l}_2) 2\Delta r][1 + (\Delta r/\overline{l}_2) \sin \alpha] \quad (14b)$$

Equations 14a and 14b can be solved for $\Delta r$ as a function of the measured image sizes $y_1$ and $y_2$. The solution is that of a quadratic equation. If the second order term $\Delta r^2$ is dropped as small compared to the first order terms, Equations 14a and 14b can be simply solved for the diameter of object 11. When this is done, the two mutually perpendicular diameters $d_1$ and $d_2$ of object 11 are calculated from two equations of the form $$d_1 32 k_1 + k_2 y_1 \quad (15a)$$

$$d_2 = k_3 + k_4 y_2 \quad (15b)$$

The constants $k_1$, $k_2$, $k_3$ and $k_4$ can be readily calculated from equations 14a and 14b. Equations 15a and 15b thus allow the calculation of the correct diameters from the image sizes detected by arrays 21 and 22.

I claim:

1. Structure to produce a measure of the average diameter of a selected, approximately circular, cross-section of an object, which comprises:
   means for producing a first set of signals representing a first diameter of said object at said selected cross-section;
   means for producing a second set of signals representing a second diameter of said object at said selected cross-section; and
   means for processing said first set of signals and said second set of signals to produce said measure of said average diameter;
   wherein said means for producing a first set of signals and said means for producing a second set of signals each comprise
   a linear array of photosensitive elements formed on a chip of semiconductor material;
   lens means for focusing light representing a diameter of said object on said photosensitive elements; and
   means for scanning said photosensitive elements to generate a sequence of pulses representing the incident energy detected by adjacent photosensitive elements in said linear array, said pulses comprising a set of signals representing said diameter of said object.

2. Structure as in claim 1 wherein said means for producing a first set of signals and said means for producing a second set of signals each include in addition;
   means of illuminating said object thereby to generate said light representing said diameter of said object.

3. Structure for producing a measure of the average diameter of a selected, approximately circular, cross-section of an object and a measure of the shift in location of said cross-section from its expected location, which comprises:
   means for producing a first set of signals representing a first diameter of said object at said selected cross-section;
   means for producing a second set of signals representing a second diameter of said object at said selected cross-section;
   means for processing said first set of signals and said second set of signals to produce said measure of said average diameter; and
   means for measuring the shift in location of said cross-section from its expected location by measuring the difference between the first diameter and the second diameter of said cross-section measured by said means for producing a first set of signals and said means for producing a second set of signals.

4. Structure as in claim 3 wherein said object is a log.

5. Structure for measuring the curvature of a substantially cylindrical object possessing a center line through the center of all cross-sections of said object, said structure comprising:
   means for producing a plurality of first sets of signals representing a plurality of first diameters of said object at a plurality of selected cross-sections;
   means for producing a plurality of second sets of signals representing a plurality of second diameters of said object at said plurality of selected cross-sections; and
   means for measuring the curvature of said object by calculating from said plurality of first sets of signals and said plurality of second sets of signals the shifts in the locations of the center line of said object at said plurality of selected cross-sections of said object as said object, on the one hand, and said means for producing a plurality of first sets of signals and said means for producing a plurality of second sets of signals, on the other hand, move relative to each other.

6. Structure as in claim 5 wherein said substantially cylindrical object is a log.

7. Structure to produce a measure of the average diameter of a selected, approximately circular, cross-section of an object, which comprises:
   means for producing a first set of signals representing a first diameter of said object at said selected cross-section;
   means for producing a second set of signals representing a second diameter of said object at said selected cross-section; and
   means for processing said first set of signals and said second set of signals to produce said measure of said average diameter;
   wherein said means for producing a first set of signals is oriented substantially perpendicular to said means for producing a second set of signals; and
   wherein said means for producing a first set of signals has a first center line, said means for producing a second set of signals has a second center line, and said means for producing a first set of signals and said means for producing a second set of signals are located such that said first center line and said second center line each make an angle of approximately 45° with the vertical.

8. Structure as in claim 7 wherein said means for producing a first set of signals and said means for producing a second set of signals each comprises a linear sequence of photo-sensitive devices, each photo-sensitive device being capable of being operated to store an amount of charge representative of the total light from a given segment of space occupied by said object being measured by said linear array means.

9. Structure as in claim 8 wherein the segment of space represented by the light impinging on any one photo-sensitive element in said means for producing a first set of signals or in a means for producing said second set of signals corresponds to a linear distance along the respective dimension being measured of said object.

10. Structure as in claim 7 wherein the nominal distances from said means for producing a first set of signals and said means for producing a second set of signals to the center of said cross section are approximately equal.

11. Structure as in claim 7 wherein said means for producing a first set of signals and said means for producing a second set of signals each comprise a linear array of photo-sensitive elements.

* * * * *